United States Patent
Perloff

(10) Patent No.: US 6,715,009 B1
(45) Date of Patent: Mar. 30, 2004

(54) METHOD AND APPARATUS FOR COORDINATING COOPERATING RESOURCES AND ITS APPLICATION

(75) Inventor: Ronald S. Perloff, Poway, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/468,479

(22) Filed: Dec. 21, 1999

(51) Int. Cl.$^7$ .................................................. G06F 3/00
(52) U.S. Cl. ...................... 710/56; 710/33; 709/104; 711/137
(58) Field of Search ................................ 710/1, 13, 18, 710/33, 36, 56, 52, 54, 65, 107; 370/389; 712/229; 709/104; 711/100, 137

(56) References Cited

U.S. PATENT DOCUMENTS

| 4,839,866 | A | * | 6/1989 | Ward et al. ................. | 365/221 |
| 5,323,399 | A | * | 6/1994 | Kurano ....................... | 370/112 |
| 5,502,822 | A | * | 3/1996 | Takebe ........................ | 395/310 |
| 5,530,458 | A | * | 6/1996 | Wakasu ....................... | 345/200 |
| 5,940,863 | A | * | 8/1999 | Fimoff et al. ................ | 711/157 |
| 6,335,940 | B1 | * | 1/2002 | Ma ............................. | 370/535 |
| 6,530,000 | B1 | * | 3/2003 | Krantz et al. ................ | 711/151 |
| 6,567,315 | B2 | * | 5/2003 | Takase et al. .......... | 365/185.28 |

* cited by examiner

Primary Examiner—Rehana Perveen
Assistant Examiner—Rijue Mai
(74) Attorney, Agent, or Firm—Blakely, Sokoloff, Taylor & Zafman LLP

(57) ABSTRACT

An apparatus is provided with a first and a second first in, first out storage structure (FIFO) that are correspondingly associated with a first and a second resource. The apparatus is further provided with first and second control logic correspondingly coupled to the first and the second FIFO to write a first and a second control value into a first and a second current write storage location of the first and the second FIFO respectively when the first resource is assigned with a first task. The first and second control logic further write the second and the first control value into a third and a fourth current write storage location of the first and the second FIFO respectively when the second resource is assigned with a second task. Together, the elements enable the resources to cooperatively generate results for the sink process.

19 Claims, 4 Drawing Sheets

CCL = COOPERATION CONTROL LOGIC

US 6,715,009 B1

METHOD AND APPARATUS FOR COORDINATING COOPERATING RESOURCES AND ITS APPLICATION

BACKGROUND OF THE INVENTION

1. Field of the Invention

The present invention relates to the field of data processing and data communication. More specifically, the present invention relates to techniques to allow resources of data processing/data communication devices to cooperatively generate results for a sink process of these devices.

2. Background Information

FIG. 1 shows a system with source process 52 feeding n resources 54, the outputs of which are collected by sink process 56. In some applications, any of the resources 54 is capable of performing the task, and availability is the primary reason to select one resource 54 over another. For example, a computer with multiple arithmetic logic units (ALU) might give one operation to ALU #1, and give the next operation to ALU #2. Similarly, a network switch or router with multiple look-up engines (LUE) could give the first look up task to LUE #1, and the next look up task to LUE #2. In the latter example, however, it might not be possible to insure that all look-up actions terminate in the same amount of time, and therefore, the operations can finish out of order.

An example such potential out-of-order finish look-up task is look-ups performed by switches/routers to determine data associated with addresses (IP, MAC or otherwise). FIG. 2 illustrates how such look-ups are typically performed, that is by looking for matches between a presented query number 102 and a set of threaded entries 104. Each entry 106 consists of comparand 108, payload 110 and pointer 112. Each pointer 112 points to the location of the next entry, except for the last entry 106, whose "pointer" 112 is set to null. The query number 102 is mapped to an initial pointer 114 that points to the beginning of the thread. At each entry, the comparand 108 is matched against the query number 102. If they agree, the look up is successful, and the associated payload 110 is reported as the look up result. If they disagree, and the associated pointer 112 is non-zero, the look up process continues with the next entry 116. The process continues until either a match is found, or the last entry 106 is encountered, where the associated pointer is null (or zero). In such case, the look up process reports failure. Accordingly, each look-up may take different amount of time, and sequentially dispatched look-ups may as a result finish out-of-order.

Thus, a mechanism that can facilitate the resources to cooperatively generate results for a sink process is desired.

SUMMARY OF THE INVENTION

An apparatus is provided with a first and a second first in, first out storage structure (FIFO) that are correspondingly associated with a first and a second resource. The apparatus is further provided with first and second control logic correspondingly coupled to the first and the second FIFO to write a first and a second control value into a first and a second current write storage location of the first and the second FIFO respectively when the first resource is assigned with a first task. The first and second control logic further write the second and the first control value into a third and a fourth current write storage location of the first and the second FIFO respectively when the second resource is assigned with a second task.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described, and various details will be set forth in order to provide a thorough understanding of the present invention. However, it will be apparent to those skilled in the art that the present invention may be practiced with only some or all aspects of the present invention, and the present invention may be practiced without the specific details. In other instances, well known features are omitted or simplified in order not to obscure the present invention. Furthermore, repeated usage of the phrase "in one embodiment" does not necessarily refer to the same embodiment, although it may.

Figure 1:
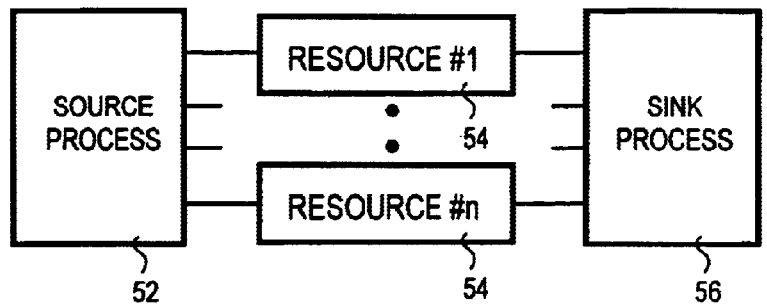
FIG. 1 illustrates an example system with n resources.
Figure 2:
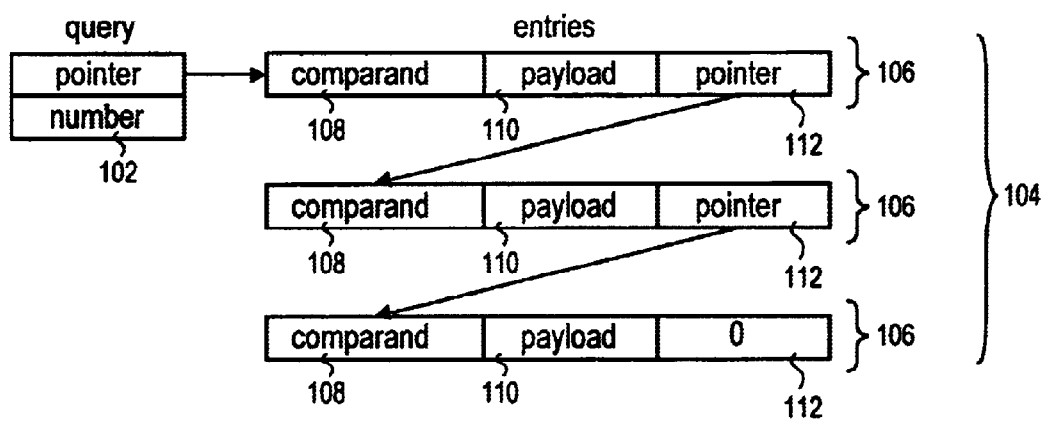
FIG. 2 illustrates an example threaded look-up.
Figure 3:
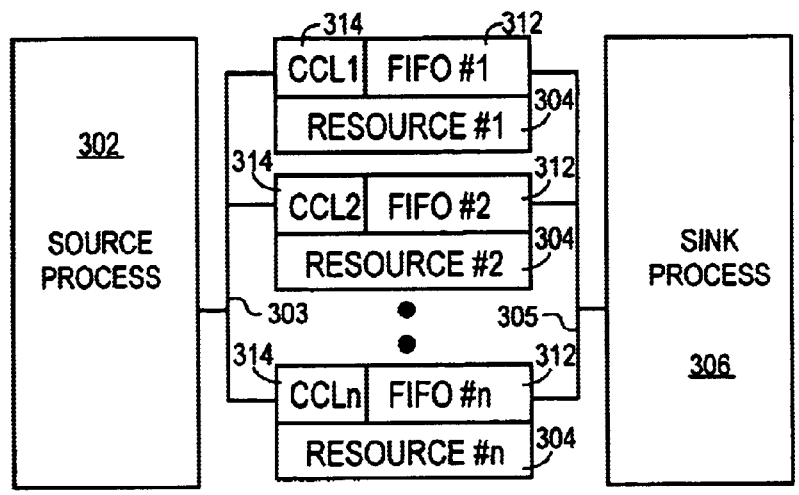
FIG. 3 illustrates an apparatus view of the present invention, in accordance with one embodiment.

Referring now to FIG. 3, an apparatus view of the present invention in accordance with one embodiment is shown. As illustrated, system 300 includes source process 302, source bus 303, resources 304, sink bus 305 and sink process 306. Additionally, in accordance with the present invention, system 300 is provided with first in, first out storage structures (FIFO) 312, and cooperation control logics 314, which are correspondingly associated with resources 304. In one embodiment, FIFOs 312 and control logics 314 are separate from, but corresponding to resources 304. In another embodiment, FIFOs 312 and control logics 314 are integral parts of resources 304. [The term "process", as used herein, includes hardware and/or software.]

Process 302 assigns tasks to resources 304, which in turn perform the assigned tasks, and in due course, output the results of the performed tasks for consumption by sink process 302. However, in accordance with the present invention, each resource 304 outputs its task results in the order it is assigned the task. If a resource 304 finishes performance of its assigned task early, i.e. earlier completion than other resources 304 earlier assigned with other tasks, the resource 304 will wait until all resources 304 having earlier assigned tasks have output their task results, before outputting its own task results.

FIFOs 312 are used to store certain control values to facilitate resources 304 to so operate, i.e. to output their task results, in order. The control values in conjunction with the locations where they are stored in the respective FIFOs 312 reflect the order resources 304 are assigned the various tasks. For the illustrated embodiment, a control value of one is stored into a current write memory location of FIFO 312 of an assigned resource 304, when the resource 304 is assigned the task. A control value of zero is stored into the corresponding current write memory locations of the other FIFOs 312 of the other resources 304. Upon completion of an assigned task, a resource 304 waits for the condition where the current read memory location of its FIFO 312 outputs the control value of one before outputting its task results for sink process 306 (more specifically, for the illustrated embodiment, before arbitrating for bus 305 to output its task results for sink process 306).

Source process 302 and sink process 306 are intended to represent a broad range of elements in data processing and data communication devices, that operate in these roles, i.e. assigner of tasks, and consumer of results, known in the art. Similarly, resources 304 are intended to represent a broad range of task performing elements known in the art for these devices, including but not limited to the earlier mentioned ALUs, and LUEs. Buses 303 and 305 may be any single bus or multi-bus systems known in the art.

Figure 4:
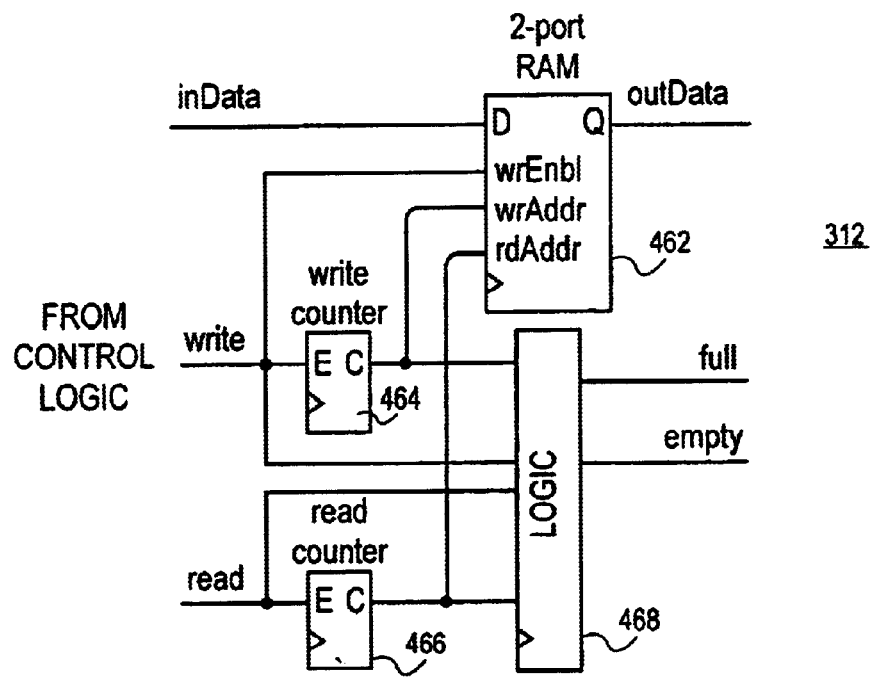
FIG. 4 illustrates FIFO of FIG. 3 in further detail, in accordance with one embodiment.

FIG. 4 illustrates FIFO 312 in further detail in accordance with one embodiment. FIFO 312 includes dual port memory array 462 having a number of memory locations, write counter 464, read counter 466 and full/empty logic 468, coupled to each other as shown. The number of memory locations correspond to the total number of task results cooperating resources 304 can hold. For example, if there are n cooperating resources, and each cooperating resource can hold up to m task results in order, m×n storage memory locations are needed (m and n being integers greater than or equal to 1). [The number m may be different for each cooperating resource.] Write data may be sequentially written into memory locations of memory array 462 by applying a write signal to increment write counter 464, whose output is applied to the write address inputs of memory array 462. Likewise, read data may be sequentially read from memory locations of memory array 462 by applying a read signal to increment read counter 466, whose output is applied to the read address inputs of memory array 462. By monitoring the output of write and read counters 464 and 466, full/empty logic 468 is able to set a "full" control signal to "true" to inform a user component that RAM array 462 is full (accordingly, should not be further written into) and set an "empty" control signal to "false" to inform the user component that RAM array 462 is non-empty (accordingly, may be read to process the written data).

Figure 5:
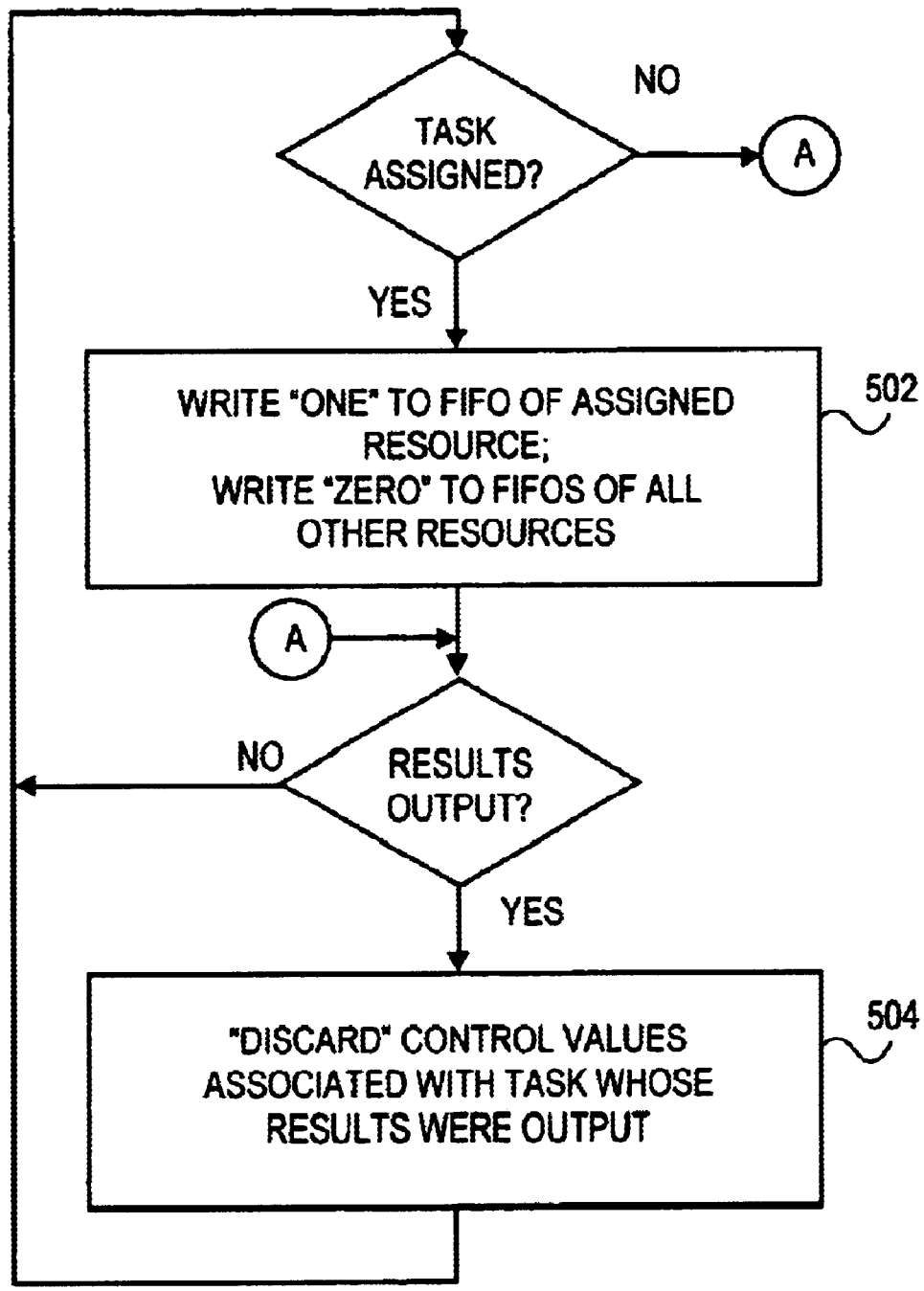
FIG. 5 illustrates a method view of the present invention, in accordance with one embodiment.

FIG. 5 illustrates a method view of the present invention, in accordance with one embodiment. The illustration assumes at power on/reset, FIFOs 312 are initialized to zero, and its write and read counters are both initialized to point to an initial first memory location. At 502, in response to a task being assigned by source process 302 to one of the resources 304, cooperation control logic 314 associated with the resources 304 cause the appropriate control values to be written into the corresponding current write memory locations of the associated FIFOs 312. As described earlier, the cooperation control logic 314 associated with the assigned resource 304 will cause a control value of one be written into the current memory location of the associated FIFO 312, all other cooperation logics 314 associated with the other resources 304 will cause a control value of zero be written into the corresponding current memory locations of the associated FIFOs 312. For an embodiment employing the FIFO of FIG. 4, the write counters of the associated FIFOs 312 will be correspondingly incremented to point to corresponding new current write memory locations in the respective FIFOs 312 in preparation for the next assignment.

At 504, in response to task results being output by one of the resources 304 for sink process 306, cooperation control logic 314 associated with the resources 304 cause the control values output by the current read memory locations of the associated FIFOs 312 be discarded. For an embodiment employing the FIFO of FIG. 4, "discarding" is effectuated by the cooperation control logics 314 incrementing the read counters of the associated FIFOs 312 to point to corresponding new current read memory locations. Recall that under the present invention, a resource 304 will arbitrate for sink bus 305 to provide its task results to sink process 306 only if the control value output by the current read memory location of its FIFO 312 has the value of one. Thus, by so incrementing the read counters of all FIFO 312, the FIFO 312 associated with the outputting resource 304 discards a control value of one, while the FIFOs 312 of other resources 304 discard a control value of zero. By so advancing the read counters of the FIFOs 312, a waiting resource 304 may now become "eligible" to output its task results. If the control value output by the current memory location of its associated FIFO 312 remains having the value zero, the waiting resource 304 continues to wait.

Thus, by so recording the order of assignment, and by so observing and aligning their outputs to the order of assignment, orderly provision of results to sink process 306 is ensured.

Figure 6:
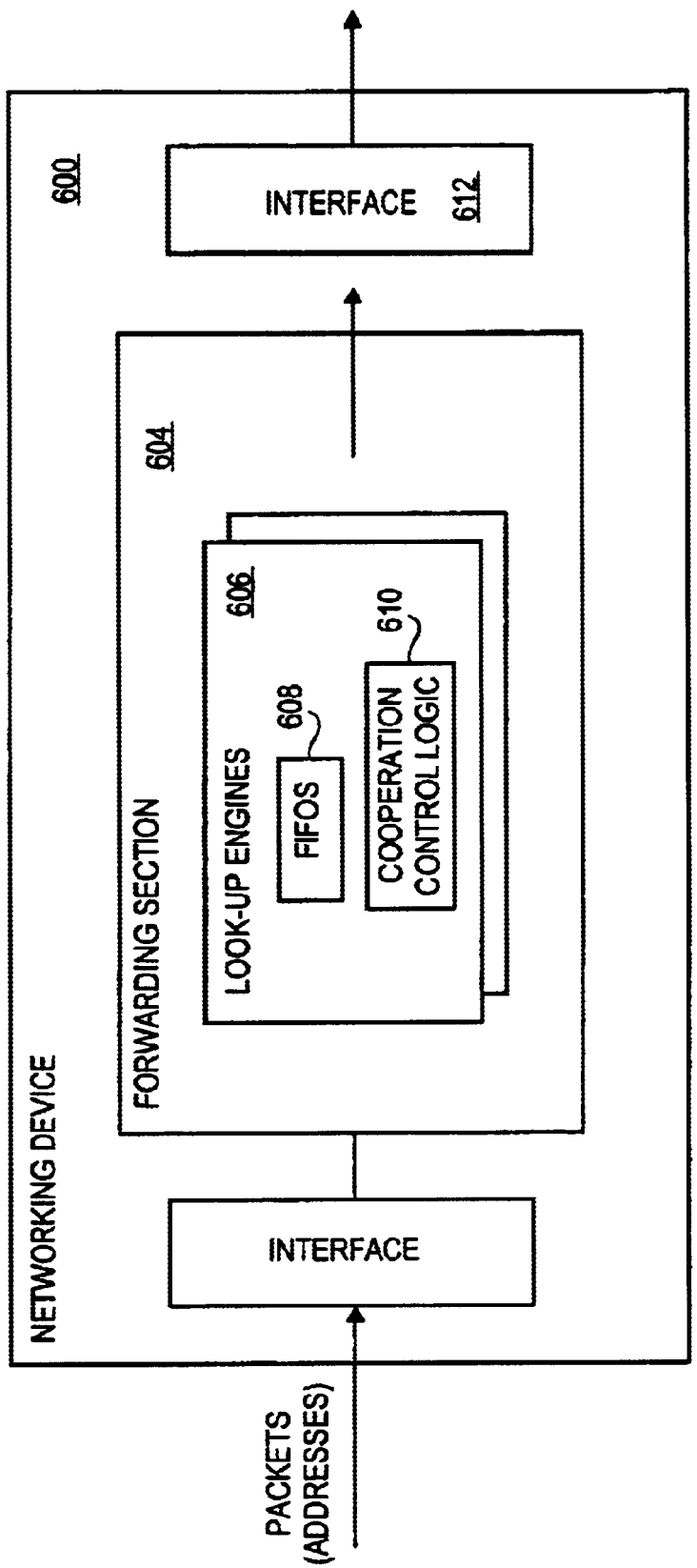
FIG. 6 illustrates an example network device incorporated with the teachings of the present invention.

Referring now to FIG. 6, wherein an example application of the present invention is shown. As illustrated, networking device 600 includes first and second I/O interfaces 602 and 612 and forwarding section 604. Forwarding section 604 includes multiple look up engines 606, for looking up data associated with addresses, such as IP or MAC addresses. Look up engines 606, as described earlier, are provided with associated FIFOs 608 and associated control logics 610. Except for the provision of FIFOs 608 and associated control logics 610, and their manner of operation, networking device 600 is intended to represent a broad range of networking devices known in the art, including but not limited to routers and switches.

Accordingly, an apparatus and method for multiple resources to cooperatively generate results, and their application have been described.

Epilogue

From the foregoing description, those skilled in the art will recognize that many other variations of the present invention are possible. Thus, the present invention is not limited by the details described, instead, the present invention can be practiced with modifications and alterations within the spirit and scope of the appended claims.

What is claimed is:

1. An apparatus comprising:
   a first and a second first in, first out storage structure (FIFO) correspondingly associated with a first and a second resource; and
   first and second logic correspondingly coupled to the first and the second FIFO to write a first and a second control value into a first and a second current write storage location of the first and the second FIFO respectively when the first resource is assigned with a first task, to write the second and the first control value into a third and a fourth current write storage location of the first and the second FIFO respectively when the second resource is assigned with a second task, to remove the first and the second control value from a first and a second current read storage location of the first and the second FIFO respectively when the first resource outputs a first result of the first task, and to remove the second and the first control value from a third and a fourth current read storage location of the first and the second FIFO respectively when the second resource outputs a second result of the second task.

2. The apparatus of claim 1, wherein the apparatus further comprises the first and the second resource, and a bus coupled to both the first and second resources, each of said first and second resources arbitrates for said bus to respectively output said first and second results of said respective first and second tasks only if said respective first and second current read storage locations contain said first control value.

3. The apparatus of claim 2, wherein the first and the second FIFOs are part of the first and the second resource respectively.

4. The apparatus of claim 2, wherein the first and the second control logic are part of the first and the second resource respectively.

5. The apparatus of claim 2, wherein the first and second resources are look-up engines to look up data associated with inputs.

6. The apparatus of claim 5, wherein the apparatus is a networking device including a forwarding section to look up data associated with addresses, and said first and second resources are look up engines of said forwarding section.

7. The apparatus of claim 6, wherein the networking device is selected from a group consisting of a gateway, a router, and a switch.

8. The apparatus of claim 7, wherein said addresses are selected from a group consisting of IP addresses and MAC addresses.

9. A method comprising:
storing a first and a second control value in a first and a second current write storage location of a first and a second first in, first out storage structure (FIFO) respectively, when a first resource is assigned a first task;
storing the second and the first control value in a third and a fourth current write storage location of the first and the second FIFO respectively, when a second resource is assigned a second task;
removing the first and the second control value in a first and a second current read storage location of the first and the second FIFO respectively, when the first resource outputs a first result of the first task; and
removing the second and the first control value in a third and a fourth current read storage location of the first and the second FIFO respectively, when the second resource outputs a second result of the second task.

10. The method of claim 9, wherein the method further comprising:
said first resource arbitrating for a bus to output said first result, when the first current read storage location of the first FIFO contains said first control value; and
said second resource arbitrating for the bus to output said second result, when the third current read storage location of the second FIFO contains said first control value.

11. A method comprising:
removing a first and a second control value in a first and a second current read storage location of a first and a second first in, first out storage structure (FIFO) respectively, when a first resource outputs a first result of a first task;
removing the second and the first control value in a third and a fourth current read storage location of the first and the second FIFO respectively, when a second resource outputs a second result of a second task;
said first resource arbitrating for a bus to output said first result, when the first current read storage location of the first FIFO contains said first control value; and
said second resource arbitrating for the bus to output said second result, when the third current read storage location of the second FIFO contains said first control value.

12. An apparatus comprising:
a first in, first out storage structure (FIFO) to associate with one of multiple system resources, to store results of tasks completed by the one resource; and
a control logic coupled with the FIFO to:
store a control value in a current write memory location of the FIFO when any of the multiple system resources receives a task to be completed, the control value assigned a logic state of true if the resource that received a task is the one resource associated with the FIFO, and otherwise assigned a logic state of false, and
access a current read memory location of the FIFO when any of the multiple parallel system resources indicates that a task is completed, and indicate to the FIFO to output the stored task result if the control value read from the current read memory location is a logic state of true.

13. The apparatus of claim 12, further comprising the one multiple system resource.

14. The apparatus of claim 13, wherein the resource includes the FIFO.

15. The apparatus of claim 12, wherein the control logic stores a high voltage state for a logic state of true, and a low voltage state for a logic state of false.

16. A system comprising:
multiple resources operating in parallel to receive and execute tasks;
multiple first in, first out storage cells (FIFO), each corresponding separately to one of the multiple resources, to store results of the executed tasks; and
multiple control logic units, each coupled with one of the FIFOs, to write to a current write location of the respective FIFOs a control value of logic state true if the resource corresponding to the control logic unit receives a task, and a control value of logic state false if a resource not corresponding to the control logic unit receives a task, and to read a current read location of the respective FIFOs when one of the resources completes execution of a task, and indicate to the respective FIFOs to output the stored results of the executed tasks when a control value of logic state true is read from the current read location of the respective FIFOs.

17. The system of claim 16, wherein at least some of the FIFOs are included within the associated resources.

18. The system of claim 16, wherein the system resources comprise look-up engines to look up data associated with inputs.

19. The system of claim 16, wherein the system resources comprise network devices with forwarding capabilities to look up data associated with addresses of network data.

* * * * *

UNITED STATES PATENT AND TRADEMARK OFFICE
CERTIFICATE OF CORRECTION

PATENT NO. : 6,715,009 B1
DATED : March 30, 2004
INVENTOR(S) : Perloff

It is certified that error appears in the above-identified patent and that said Letters Patent is hereby corrected as shown below:

<u>Column 3,</u>
Line 59, delete "F1FOs" and insert -- FIFOs --.

<u>Column 4,</u>
Line 30, delete "F1FOs" and insert -- FIFOs --.

Signed and Sealed this

Tenth Day of August, 2004

JON W. DUDAS
*Acting Director of the United States Patent and Trademark Office*